(12) United States Patent
Rinne et al.

(10) Patent No.: US 7,156,284 B2
(45) Date of Patent: *Jan. 2, 2007

(54) LOW TEMPERATURE METHODS OF BONDING COMPONENTS AND RELATED STRUCTURES

(75) Inventors: Glenn A. Rinne, Apex, NC (US); Krishna K. Nair, Apex, NC (US)

(73) Assignee: Unitive International Limited, Curacao (AN)

( * ) Notice: Subject to any disclaimer, the term of this patent is extended or adjusted under 35 U.S.C. 154(b) by 159 days.

This patent is subject to a terminal disclaimer.

(21) Appl. No.: 10/790,967

(22) Filed: Mar. 2, 2004

(65) Prior Publication Data

US 2004/0169064 A1  Sep. 2, 2004

Related U.S. Application Data

(63) Continuation of application No. 10/017,350, filed on Dec. 14, 2001, now Pat. No. 6,863,209.

(60) Provisional application No. 60/256,072, filed on Dec. 15, 2000.

(51) Int. Cl.
  *B23K 31/02* (2006.01)
(52) U.S. Cl. .................... 228/194; 228/248.1
(58) Field of Classification Search ........... 228/193, 228/194, 195, 234.1, 245, 246, 248.1, 428.5, 228/180.5; 428/548, 554, 558; 419/8, 22, 419/36, 48, 57; 219/129
See application file for complete search history.

(56) References Cited

U.S. PATENT DOCUMENTS

| | | | |
|---|---|---|---|
| 3,105,869 A | 10/1963 | Branch et al. | |
| 3,244,947 A | 4/1966 | Slater | |
| 3,259,814 A | 7/1966 | Green | |
| 3,274,458 A | 9/1966 | Boyer et al. | |
| 3,316,465 A | 4/1967 | von Bermuth et al. | |
| 3,458,925 A | 8/1969 | Napier et al. | |
| 3,461,357 A | 8/1969 | Mutter et al. | |
| 3,489,965 A | 1/1970 | Helsdon | |
| 3,497,774 A * | 2/1970 | Hornberger et al. | 257/537 |
| 3,501,681 A | 3/1970 | Weir | |
| 3,602,979 A | 9/1971 | La Iacona | |
| 3,663,184 A | 5/1972 | Wood et al. | |
| 3,760,238 A | 9/1973 | Hamer et al. | |
| 3,770,874 A | 11/1973 | Krieger et al. | |
| 3,839,727 A | 10/1974 | Herdzik et al. | |
| 3,871,015 A | 3/1975 | Lin et al. | |
| 3,897,871 A | 8/1975 | Zimnbauer | |

(Continued)

FOREIGN PATENT DOCUMENTS

CN  1269607  1/2002

(Continued)

OTHER PUBLICATIONS

E.K. Yung et al; *Flip-Chip Process Utilizing Electroplated Solder Joints*; Proceedings of the Technical Conference, 1990 International Electronics Packaging Conference, Sep. 10-12, 1990 pp. 1065-1079.

(Continued)

*Primary Examiner*—Kevin Kerns
*Assistant Examiner*—Michael Aboagye
(74) *Attorney, Agent, or Firm*—Myers Bigel Sibley & Sajovec

(57) ABSTRACT

Methods of bonding two components may include positioning the components relative to one another to obtain a desired orientation. Once the desired orientation is obtained, the components can be bonded in the desired orientation with metal wherein a temperature of both components is maintained below a melting temperature of the metal while bonding. Related structures are also discussed.

45 Claims, 4 Drawing Sheets

U.S. PATENT DOCUMENTS

| | | | |
|---|---|---|---|
| 3,916,080 A | 10/1975 | Wakamatsu | |
| 3,923,231 A * | 12/1975 | Catalano et al. | 228/194 |
| 3,942,187 A | 3/1976 | Gelsing et al. | |
| 3,959,577 A | 5/1976 | Frink | |
| 3,986,255 A | 10/1976 | Mandal | |
| 3,993,123 A | 11/1976 | Chu et al. | |
| 4,059,217 A * | 11/1977 | Woodward | 228/181 |
| 4,074,342 A | 2/1978 | Honn et al. | |
| 4,113,578 A | 9/1978 | Del Monte | |
| 4,113,587 A | 9/1978 | Chikamori | |
| 4,168,480 A | 9/1979 | De Lucia | |
| 4,244,002 A | 1/1981 | Sato et al. | |
| 4,257,905 A | 3/1981 | Christophorou et al. | |
| 4,266,282 A | 5/1981 | Henle et al. | |
| 4,273,859 A | 6/1981 | Mones et al. | |
| 4,325,734 A | 4/1982 | Burrage et al. | |
| 4,332,341 A * | 6/1982 | Minetti | 228/180.22 |
| 4,382,517 A | 5/1983 | Welsch | |
| 4,449,580 A | 5/1984 | Reisman et al. | |
| 4,473,263 A | 9/1984 | Sunstein | |
| 4,505,029 A | 3/1985 | Owyang et al. | |
| 4,511,873 A | 4/1985 | Baier et al. | |
| 4,532,576 A | 7/1985 | Reimer | |
| 4,545,610 A | 10/1985 | Lakritz et al. | |
| 4,563,697 A | 1/1986 | Miura | |
| 4,565,901 A | 1/1986 | Hirooka et al. | |
| 4,614,296 A | 9/1986 | Lesgourgues | |
| 4,640,438 A | 2/1987 | Trevison et al. | |
| 4,657,146 A | 4/1987 | Walters | |
| 4,661,375 A | 4/1987 | Thomas | |
| 4,673,772 A | 6/1987 | Satoh et al. | |
| 4,676,843 A * | 6/1987 | Nazmy | 419/8 |
| 4,733,813 A | 3/1988 | Le Meau et al. | |
| 4,752,027 A | 6/1988 | Oschwend | |
| 4,763,829 A | 8/1988 | Sherry | |
| 4,783,722 A | 11/1988 | Osaki et al. | |
| 4,817,850 A | 4/1989 | Wiener-Avenear et al. | |
| 4,830,264 A | 5/1989 | Bitaillou et al. | |
| 4,840,302 A | 6/1989 | Gardner et al. | |
| 4,855,809 A | 8/1989 | Malhi et al. | |
| 4,878,611 A | 11/1989 | LoVasco et al. | |
| 4,893,403 A | 1/1990 | Heflinger et al. | |
| 4,897,508 A | 1/1990 | Mahulikar et al. | |
| 4,897,918 A | 2/1990 | Osaka et al. | |
| 4,927,505 A | 5/1990 | Sharma et al. | |
| 4,931,410 A | 6/1990 | Tokunaga et al. | |
| 4,940,181 A | 7/1990 | Juskey, Jr. et al. | |
| 4,948,754 A | 8/1990 | Kondo et al. | |
| 4,950,623 A | 8/1990 | Dishon | |
| 4,962,058 A | 10/1990 | Cronin et al. | |
| 4,972,988 A | 11/1990 | Ohdate | |
| 5,009,360 A | 4/1991 | Reisman et al. | |
| 5,019,943 A | 5/1991 | Fassbender | |
| 5,022,580 A | 6/1991 | Pedder | |
| 5,024,372 A | 6/1991 | Altman et al. | |
| 5,025,304 A | 6/1991 | Reisman et al. | |
| 5,046,161 A | 9/1991 | Takada | |
| 5,048,747 A | 9/1991 | Clark et al. | |
| 5,113,314 A | 5/1992 | Wheeler et al. | |
| 5,130,779 A | 7/1992 | Agarwala et al. | |
| 5,135,155 A | 8/1992 | Kang et al. | |
| 5,145,532 A | 9/1992 | Fukunaga et al. | |
| 5,147,084 A | 9/1992 | Behun et al. | |
| 5,152,451 A | 10/1992 | Derveaux et al. | |
| 5,154,341 A | 10/1992 | Melton et al. | |
| 5,160,409 A | 11/1992 | Moore et al. | |
| 5,162,257 A | 11/1992 | Yung | |
| 5,171,711 A | 12/1992 | Tobimatsu et al. | |
| 5,194,137 A | 3/1993 | Moore et al. | |
| 5,216,280 A | 6/1993 | Tanaka et al. | |
| 5,227,664 A | 7/1993 | Toshio | |
| 5,234,149 A | 8/1993 | Katz et al. | |
| 5,239,447 A | 8/1993 | Cotues et al. | |
| 5,240,881 A | 8/1993 | Cayetano et al. | |
| 5,250,843 A | 10/1993 | Eichelberger | |
| 5,251,806 A | 10/1993 | Agarwala et al. | |
| 5,289,925 A | 3/1994 | Newmark | |
| 5,293,006 A | 3/1994 | Yung | |
| 5,325,265 A | 6/1994 | Turlik et al. | |
| 5,327,013 A | 7/1994 | Moore et al. | |
| 5,327,327 A | 7/1994 | Frew et al. | |
| 5,335,795 A | 8/1994 | Chizen | |
| 5,347,428 A | 9/1994 | Carson et al. | |
| 5,354,711 A | 10/1994 | Heitzmann et al. | |
| 5,381,946 A | 1/1995 | Koopman et al. | |
| 5,391,514 A | 2/1995 | Gall et al. | |
| 5,392,982 A | 2/1995 | Li | |
| 5,406,701 A | 4/1995 | Pepe et al. | |
| 5,409,862 A | 4/1995 | Wada et al. | |
| 5,424,920 A | 6/1995 | Miyake | |
| 5,432,729 A | 7/1995 | Carson et al. | |
| 5,453,582 A | 9/1995 | Amano et al. | |
| 5,470,787 A | 11/1995 | Greer | |
| 5,475,280 A | 12/1995 | Jones et al. | |
| 5,492,235 A | 2/1996 | Crafts et al. | |
| 5,539,186 A | 7/1996 | Abrami et al. | |
| 5,542,174 A | 8/1996 | Chiu | |
| 5,542,602 A | 8/1996 | Gaynes et al. | |
| 5,547,740 A | 8/1996 | Higdon et al. | |
| 5,551,627 A | 9/1996 | Leicht et al. | |
| 5,553,769 A | 9/1996 | Ellerson et al. | |
| 5,557,502 A | 9/1996 | Banerjee et al. | |
| 5,609,287 A | 3/1997 | Izuta et al. | |
| 5,616,962 A | 4/1997 | Ishikawa et al. | |
| 5,621,607 A | 4/1997 | Farahmandi et al. | |
| 5,627,396 A | 5/1997 | James et al. | |
| 5,634,268 A | 6/1997 | Dalal et al. | |
| 5,680,296 A | 10/1997 | Hileman et al. | |
| 5,736,456 A | 4/1998 | Akram | |
| 5,739,053 A | 4/1998 | Kawakita et al. | |
| 5,744,382 A | 4/1998 | Kitayama et al. | |
| 5,751,556 A | 5/1998 | Butler et al. | |
| 5,773,359 A | 6/1998 | Mitchell et al. | |
| 5,793,116 A | 8/1998 | Rinne et al. | |
| 5,796,168 A | 8/1998 | Datta et al. | |
| 5,796,591 A | 8/1998 | Dalal et al. | |
| 5,812,378 A | 9/1998 | Fielstad et al. | |
| 5,812,925 A * | 9/1998 | Ecer | 428/548 |
| 5,851,911 A | 12/1998 | Farnworth | |
| 5,859,470 A | 1/1999 | Ellerson et al. | |
| 5,886,393 A | 3/1999 | Merrill et al. | |
| 5,891,756 A | 4/1999 | Erickson et al. | |
| 5,892,179 A | 4/1999 | Rinne et al. | |
| 5,898,574 A | 4/1999 | Tan et al. | |
| 5,902,686 A | 5/1999 | Mis | |
| 5,906,312 A | 5/1999 | Zakel et al. | |
| 5,920,125 A | 7/1999 | Ellerson et al. | |
| 5,923,539 A | 7/1999 | Matsui et al. | |
| 5,937,320 A | 8/1999 | Andricacos et al. | |
| 5,963,793 A | 10/1999 | Rinne et al. | |
| 5,967,402 A * | 10/1999 | Kuwabara | 228/194 |
| 5,990,472 A | 11/1999 | Rinne | |
| 6,027,957 A | 2/2000 | Merritt et al. | |
| 6,083,773 A | 7/2000 | Lake | |
| 6,087,021 A | 7/2000 | Gaynes et al. | |
| 6,110,605 A * | 8/2000 | Taniguchi | 428/627 |
| 6,117,299 A | 9/2000 | Rinne et al. | |
| 6,121,069 A | 9/2000 | Boyko et al. | |
| 6,121,576 A | 9/2000 | Hembree et al. | |
| 6,133,065 A | 10/2000 | Akram | |
| 6,134,120 A | 10/2000 | Baldwin | |
| 6,162,652 A | 12/2000 | Dass et al. | |
| 6,169,325 B1 | 1/2001 | Azuma et al. | |
| 6,187,450 B1 | 2/2001 | Budinger et al. | |

| | | | | | | |
|---|---|---|---|---|---|---|
| 6,199,751 B1 | 3/2001 | Gaynes et al. | | GB | 2062 963 | 5/1981 |
| 6,208,018 B1 | 3/2001 | Ma et al. | | GB | 2 194 387 | 3/1988 |
| 6,221,682 B1 | 4/2001 | Danziger et al. | | JP | 54050269 | 4/1979 |
| 6,222,279 B1 | 4/2001 | Mis et al. | | JP | 54-128669 | 10/1979 |
| 6,224,690 B1 | 5/2001 | Andricacos et al. | | JP | 55-111127 | 8/1980 |
| 6,231,743 B1 | 5/2001 | Etherington | | JP | 57-73952 | 5/1982 |
| 6,241,145 B1 | 6/2001 | Maeda et al. | | JP | 57-197838 | 12/1982 |
| 6,281,106 B1 | 8/2001 | Higdon et al. | | JP | 59-154041 | 9/1984 |
| 6,320,262 B1 | 11/2001 | Murakami | | JP | 6-116552 | 1/1986 |
| 6,329,608 B1 | 12/2001 | Rinne et al. | | JP | 63099558 | 4/1988 |
| 6,335,104 B1 | 1/2002 | Sambucetti et al. | | JP | 63-222445 | 9/1988 |
| 6,340,113 B1 * | 1/2002 | Avery et al. ............. 228/248.5 | | JP | 403234359 A | 10/1991 |
| 6,346,469 B1 | 2/2002 | Greer | | JP | 04-133330 | 5/1992 |
| 6,388,203 B1 | 5/2002 | Rinne et al. | | JP | 4-150033 | 5/1992 |
| 6,389,691 B1 | 5/2002 | Rinne et al. | | JP | 07066207 | 1/1994 |
| 6,390,355 B1 * | 5/2002 | Jung ...................... 228/248.1 | | JP | 07-226400 | 8/1995 |
| 6,392,163 B1 | 5/2002 | Rinne et al. | | JP | 2000349111 | 12/2000 |
| 6,415,974 B1 | 7/2002 | Jao | | JP | 2002203868 | 7/2002 |
| 6,418,033 B1 | 7/2002 | Rinne | | WO | WO 93/02831 | 2/1993 |
| 6,419,974 B1 | 7/2002 | Silva et al. | | WO | WO 93/22475 | 11/1993 |
| 6,440,291 B1 | 8/2002 | Henri et al. | | WO | WO 96/30933 | 10/1996 |
| 6,441,487 B1 | 8/2002 | Elenius et al. | | WO | WO 96/31905 | 10/1996 |
| 6,452,270 B1 | 9/2002 | Huang | | WO | WO 97/03465 | 1/1997 |
| 6,452,271 B1 | 9/2002 | Jiang et al. | | WO | WO 98/06118 | 2/1998 |
| 6,492,197 B1 | 12/2002 | Rinne | | WO | WO 02/03461 | 1/2002 |
| 6,495,018 B1 | 12/2002 | Lowe | | | | |
| 6,520,401 B1 | 2/2003 | Miglietti | | | | |
| 6,521,996 B1 | 2/2003 | Seshan | | | | |
| 6,620,722 B1 | 9/2003 | Kuo et al. | | | | |
| 6,622,907 B1 | 9/2003 | Fanti et al. | | | | |
| 6,668,449 B1 | 12/2003 | Rumsey et al. | | | | |
| 6,762,122 B1 | 7/2004 | Mis et al. | | | | |
| 6,793,792 B1 | 9/2004 | Jones et al. | | | | |
| 6,835,643 B1 | 12/2004 | Akram | | | | |
| 6,853,076 B1 | 2/2005 | Datta et al. | | | | |
| 6,863,209 B1 * | 3/2005 | Rinne et al. ................. 228/194 | | | | |
| 2001/0011764 A1 | 8/2001 | Elenius et al. | | | | |
| 2001/0020745 A1 | 9/2001 | Jiang et al. | | | | |
| 2001/0042918 A1 | 11/2001 | Yanagida | | | | |
| 2002/0000665 A1 | 1/2002 | Barr et al. | | | | |
| 2002/0056742 A1 | 5/2002 | Rinne | | | | |
| 2002/0074381 A1 | 6/2002 | Rinne et al. | | | | |
| 2002/0079576 A1 | 6/2002 | Seshan | | | | |
| 2002/0086520 A1 | 7/2002 | Chiang | | | | |
| 2002/0093098 A1 | 7/2002 | Barr et al. | | | | |
| 2002/0096764 A1 | 7/2002 | Huang | | | | |
| 2002/0157247 A1 | 10/2002 | Li | | | | |
| 2002/0197842 A1 | 12/2002 | Kuo et al. | | | | |
| 2003/0000738 A1 | 1/2003 | Rumsey et al. | | | | |
| 2003/0060040 A1 | 3/2003 | Lee et al. | | | | |
| 2003/0107137 A1 | 6/2003 | Stierman et al. | | | | |
| 2003/0124833 A1 | 7/2003 | Ho-Ming et al. | | | | |
| 2003/0143830 A1 | 7/2003 | Akram | | | | |
| 2004/0053483 A1 | 3/2004 | Nair et al. | | | | |

FOREIGN PATENT DOCUMENTS

| | | |
|---|---|---|
| DE | 42 05 029 C | 2/1993 |
| DE | 43 23 799 A1 | 1/1994 |
| DE | 0 782 191 A2 | 12/1996 |
| DE | 197 41 436 | 12/1998 |
| EP | 0 355 478 | 2/1990 |
| EP | 0 603 296 | 6/1994 |
| EP | 0 609 062 A1 | 8/1994 |
| EP | 0 736 972 A1 | 10/1996 |
| EP | 0 757 386 A2 | 2/1997 |
| EP | 0 782 191 A2 | 2/1997 |
| EP | 1 146 552 | 10/2001 |
| EP | 1 148 548 | 10/2001 |
| FR | 2 406 893 | 10/1978 |
| FR | 2 688 628 | 9/1993 |
| FR | 2 705 832 | 12/1994 |
| GB | 1288564 | 9/1972 |

OTHER PUBLICATIONS

Adema et al., *Flip Chip Technology: A Method for Providing Known Good Die with High Density Interconnnections*, MCM '94 Proceedings, pp. 41-49.

Arai et al. "Sn-Ag Solder Bump Formation for Flip-Chip Bonding by Electroplating" *Journal of the Electrochemical Society* 150(10): c730-c734 (2003).

Audet, et al; *Low Cost Bumping Process for Flip Chip*, Proc. 1995 International Flip Chip, BGA, and Ado Pkg. Symposium ITAP 95, '95 Flip Chip, BGA, TAB & AP Symposium, pp. 16-21 (1995).

Chan "Investigation of Cr/Cu/Cu/Ni Under Bump Metallization for Lead-free Applications" *2002 Electronics Packaging Technology Conference* 270-275 (2002).

Choi et al; *Electromigration of Flip Chip Solder Bump on Cu/Ni(V) Al Thin Film Under Bump Metallization*; 2002 Electronic Components and Technology Conference; pp. 1201-1205.

Datta, et al., *Electrochemical Fabrication of Mechanically Robust PbSn C4 Interconnections*, J. Electrochem. Soc., vol. 142, No. 11, pp. 3779-3785 (Nov. 1995).

Drake et al; *An Electrostatically Actuated Micro-Relay*, Transducers '95, Eurosensors IX, The 8$^{th}$ International Conference on Solid-State Sensors and Actuators, and Eurosensors IX, pp. 380-383.

Edelstein, D.C., et al; Derwent Publications Ltd. London, GB: AN 2002-308284 XP-002243726.

Ezawa et al. "Eutectic Sn-Ag Solder Bump Process for ULSI Flip Chip Technology" *IEEE Transactions on Electronics Packaging Manufacturing* 24(4): 275-281 (2001).

Ezawa et al; *Pb-Free Bumping by Alloying Electroplated Metal Stacks*; 2003 Electronic Components and Technology Conference; pp. 664-667.

Graf "The Modern Dictionary of Electronics" Sixth Edition p. 386 (1984).

Greer "An Extended Eutectec Solder bump for FCOB" *1996 Electronic Componets and Technology Conference* pp. 546-551 (1996).

Guckel et al., *Electromagnetic Linear Actuators with Inductive Position Sensing for Micro Relay, Micro Value and Precision Positioning Applications*, Transducers '95, Eurosensors IX, The 8$^{th}$ International Conference on Solid-State Sensors and Actuators, and Eurosensors IX, pp. 324-327.

Hashimoto et al; *Thermally Controlled Magnetization Microrelay*, Transducers '95, Eurosensors IX, The 8$^{th}$ International Conference on Solid-State Sensors and Actuators, and Eurosensors IX, pp. 361-364.

Hirsch, *Tin-Lead, Lead and Tin Plating*, Metal Finishing, Guidebook Directory 1987, 55th Guidebood-Directory Issue 1987, Mid Jan. 1987, vol. 85, No. 1A, ISSN 0026-0576, pp. 280-284.

Hosaka et al; Electromagnetic Microrelays; Concepts and Fundamental Characteristics, Sensors and Actuators A, 40 (1994), pp. 41-47.

Howell et al: "Area Array Solder Interconnection Technology for the Three-Dimensional Silicon Cube", Proceedings of the 1995 45th Electronic Components & Technology Conference, pp. 1174-1178.

Inaba et al; *Solder Bump Formation Using Electroless Plating and Ultrasonic Soldering*, IEEE Transactions On Components, Hybrids, and Manufacturing Technology, vol. 13, No. 1, Mar. 1990, pp. 119-123.

International Search Report and Written Opinion of the International Searching Authority for International patent application No. PCT/US2005/023041 mailed on Oct. 11, 2005.

International Search Report and Written Opinion of the International Searching Authority for International Application No. PCT/US2005/012029 mailed on Oct. 28, 2005.

International Search Report dated Dec. 9, 1992 of International Application No. PCT/US 92/07722.

International Search Report for PCT/US 02/30697 mailed on Jun. 24, 2003.

International Search Report for PCT/US 03/20790 mailed on Jun. 2, 2004.

International Search Report for PCT/US2001/14674 mailed on Jan. 23, 2002.

International Search Report, PCT/US01/43948 Apr. 1, 2003.

Invitation to Pay Additional Fees and Partial International Search Report for International patent application No. PCT/US2005/012029 mailed on Jul. 26, 2005.

Jung, et al., *The Influence of NiSn Intermetallics on the Performance of Flip Chip Contacts Using a Low Cost Electroless Nickel Bumping Approach*, IEPS Proceedings of the Technical Conference, 1996 Electronics Packaging Conference, Austin, Texas, pp. 14-25 (Sep. 29-Oct. 1, 1996).

Kang, et al; *Interfacial Reactions During Soldering With Lead-Tin Eutectic and Lead (Pb)-Free, Tin-Rich Solders, Journal of Electronic Materials*, vol. 25, No. 7, pp. 1113-1120 (1996).

Kim et al. "Electrodeposition of Near-Eutectic SnAg Solders for Wafer-Level Packaging" *Journal of The Electrochemical Society* 150(9): c577-c584 (2003).

Kiumi et al. "Processing, Properties, and reliability of electroplated Lead-Free Solder Bumps" *IEEE 2002 Inter Society Conference on Thermal Phenomena* pp. 909-914 (2002).

Knüppel, *Rugged Design for Reliable Switching: Micro a Relay Sets New Automotive Standards*, Components XXIX (1994), No. 4, pp. 30-32.

Lineback, "3D IC Packaging Moves Closer to Commercial Use", Electronic World News, May 21, 1990, p. 15.

Mis, et al; *Flip Chip Production Experience: Some Design, Process, Reliability, and Cost Considerations*, ISHM '96 Proceedings, Proc. 1996 International Symposium on Microelectronics SPIE vol. 2920, pp. 291-295 (1996).

Multimedia Card Association, www.mmca.org.

PCB Assembly, *Electronic Packaging & Production*, vol. 35, No. 1, p. 40 (Jan. 1995).

SanDisk Corporation, SanDisk Flash Data Storage, San Disk Compact Flash™ and MultiMedia Card: Small Form Factor Solutions, 1999.

Solomon "Providing high Density and Performance for Chip-to Sytem Interconnection" *Advanced Packaging* (Nov. 2001) pp. 19-28.

Specification Sheet, *NaiS, Ultra Low Profile 2 Amp-Polarized Relay*, TK-Relays.

Tessier et al; *Process Considerations in Fabricating Thin Film Multi-chip Modules*, Proceedings of the Technical Conference 1989 International Electronics Packaging Conference, 1989.

Yung et al. "Flip-Chip Process Utilizing Electroplated Solder Joints" *Proceedings of the Technical Conference* (Sep. 10-12, 1990) International Electronics Packaging Conference Malborough, Massachusetts pp. 1065-1073.

Yung et al; *Electroplated Solder Joints for Flip-Chip Applications*, Transactions on Components, Hybrids, and Manufacturing Technology, vol. 14 No. 3, Sep. 1991, pp. 549-559.

Zeng et al; *Six cases of reliability study of Pb-free solder joints in electronic packaging technology*, Reports: A Review Journal; Materials Science and Engineering R 38 (2002) pp. 55-105.

\* cited by examiner

LOW TEMPERATURE METHODS OF BONDING COMPONENTS AND RELATED STRUCTURES

RELATED APPLICATIONS

The present application is a continuation of and claims the benefit of priority from U.S. application Ser. No. 10/017,350 filed Dec. 14, 2001 now U.S. Pat. No. 6,863,209, which claims the benefit of priority from U.S. Provisional Application No. 60/256,072 entitled "Room Temperature Bonding Methods For Prepositioned Components And/Or Fibers" filed Dec. 15, 2000. The disclosures of U.S. Utility application Ser. No. 10/017,350 and Provisional Application No. 60/256,072 are hereby incorporated herein in their entirety by reference.

BACKGROUND OF THE INVENTION

The present invention relates to methods of bonding components and more particularly to low temperature methods of bonding components and related structures.

It is known to bond components such as microelectronic devices to a substrate using solder reflow as discussed, for example, by E. Yung et al. in "Flip-Chip Process Utilizing Electroplated Solder Joints" (Proceedings of the Technical Conference, 1990 International Electronics Packaging Conference, Sep. 10–12, 1990, pp. 1065–1079). Flip-chip technology (also known as C4 technology) relies on gang bonding of bumped pads to a substrate with a matching footprint. SnPb solder of high lead content can be used as the bump material. The bonding mechanism is the wetting of pad metallurgy during thermal reflow of solders. The disclosure of the Yung et al. reference is hereby incorporated herein in its entirety by reference.

Reflowing solder, however, means that the solder is heated above its melting temperature, and one or both of the substrate and/or the component may also be heated above the melting temperature of the solder. In some applications, excessive heating of the substrate and/or component may not be desired. In addition, the reflow of solder may result in the outgassing or evolution of materials such as flux which may leave an undesirable residue on the component and/or substrate.

SUMMARY OF THE INVENTION

Methods of bonding components according to embodiments of the present invention may include positioning the components relative to one another to obtain a desired orientation, and bonding the components in the desired orientation with metal wherein a temperature of both components is maintained below a melting temperature of the metal while bonding. Damage to either component as a result of heating above a melting temperature may thus be reduced. In addition, outgassing and/or evolution of materials during bonding may be reduced. Moreover, misalignment resulting from thermal expansion under temperature can be reduced.

DETAILED DESCRIPTION

Figure 1:
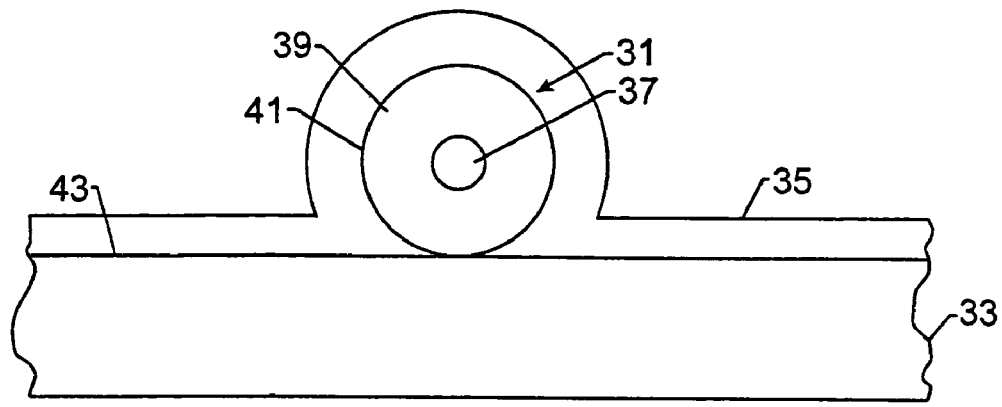
FIG. 1 is a cross-sectional view of a component bonded to a substrate using a metal layer according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness and/or dimensions of layers and regions are exaggerated for clarity. Like numbers refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present. Also, when an element is referred to as being "bonded" to another element, it can be directly bonded to the other element or intervening elements may be present. In contrast, when an element is referred to as being "directly bonded" to another element, there are no intervening elements present.

According to embodiments of the present invention, two components can be bonded using a metal bond. More particularly, the two components can be positioned relative to one another to obtain a desired orientation, and the two components can be bonded in the desired orientation with the metal wherein a temperature of the components is maintained below a melting temperature of the metal while bonding. By way of example, the bonding metal can be plated on the components being bonded, or particles of the bonding metal can be provided on the two components and then bonded to each other and to the two components being bonded. While particular examples of bonding are discussed in greater detail below with respect to bonding an optical fiber to a substrate, metal bonding methods, structures, and apparatus according to the present invention can be applied to bonding substrates; optical components such as optical fibers, laser diodes, PIN diodes, vertical cavity surface emitting lasers, lenses, and/or gratings; micro-electronic components; and micro-mechanical components.

FIG. 1 illustrates an optical fiber 31 that is bonded to a substrate 33 using a layer 35 of a plated metal. As shown, the fiber 31 includes a core 37 and cladding 39. The optical fiber 31 can also include a metallized surface 41, and the substrate can include a metallized surface 43 to facilitate plating thereon. The optical fiber 31 with the metallized surface 41 can thus be positioned relative to the substrate 33 to obtain a desired orientation therebetween, and the optical fiber can be bonded to the substrate in the desired orientation by plating the metal layer 35 thereon while maintaining the optical fiber 31 in the desired orientation relative to the substrate. By plating the metal to bond the optical fiber to the substrate, bonding can be effected without significantly increasing the temperature of the substrate or optical fiber.

More particularly, the metal layer 35 can be plated using electroplating, electroless plating, electrophoretic plating, and/or any other plating techniques known to those having skill in the art. Moreover, the plating solution can be applied using selective plating of the substrate 33 and fiber 31 in a tank of the plating solution; using localized plating such as with a brush, a sponge, a pad, an open cell foam; and/or using any other application techniques known to those having skill in the art.

When using electroplating, a plating solution including the plating metal is applied to the metallized surfaces of the substrate and optical fiber, and an anode is provided in contact with the plating solution opposite the substrate. By applying an electrical potential between the anode and the metallized surfaces of the substrate and optical fiber, plating metal from the solution can be deposited on the metallized surfaces of the substrate and optical fiber.

When using electrophoretic plating, the plating solution includes dielectric particles in addition to the plating metal. Like electroplating, the plating solution is applied to the metallized surfaces of the substrate and the optical fiber, and an anode is provided in contact with the plating solution opposite the substrate. As with electroplating, plating metal from the solution can be deposited on the metallized surfaces of the substrate and the optical fiber by applying an electrical potential between the anode and the metallized surfaces. In electrophoretic plating, the dielectric particles in the plating solution can also be incorporated in the metal layer 35 to increase a deposition thickness and/or deposition rate of the metal layer. In other words, a desired thickness of the layer 35 can be obtained more quickly because of the dielectric particles incorporated therein. In addition, the use of glasses and/or oxides as the dielectric particles can decrease a creep rate and/or increase a stiffness of the plated metal layer.

When using electroless plating, there is no need for an anode or the application of an electrical potential. In this case, the surface 43 of the substrate and the surface 41 of the optical fiber are provided with a catalyst. As many metals may act as a catalyst for electroless plating, the surfaces of the substrate and optical fiber can be metallized as discussed above. Alternatively, any other suitable electroless plating catalyst can be used in place of or in addition to metallization. By providing an electroless plating solution on the substrate and fiber with the appropriate catalyst thereon, the metal layer 35 can be plated thereon.

Figure 2A:
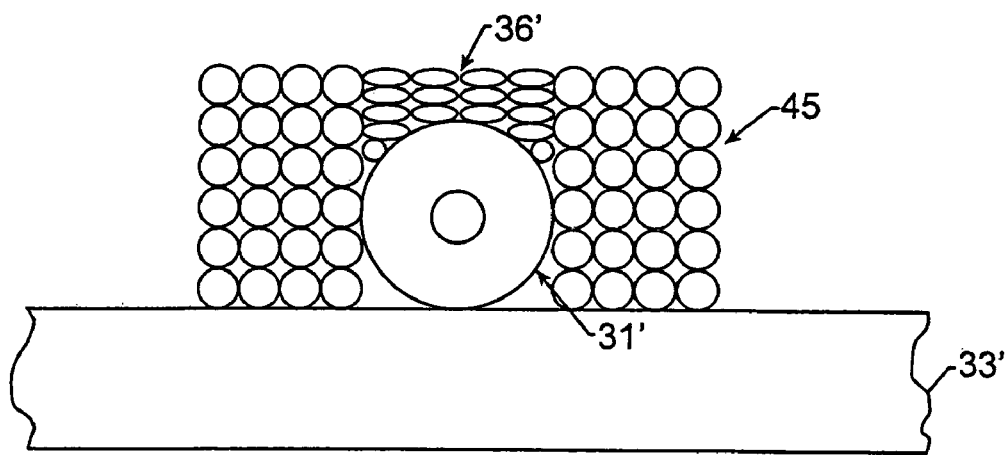
FIGS. 2A–B are cross-sectional views of intermediate steps of bonding a component and substrate using a metal layer according to embodiments of the present invention.
Figure 2B:
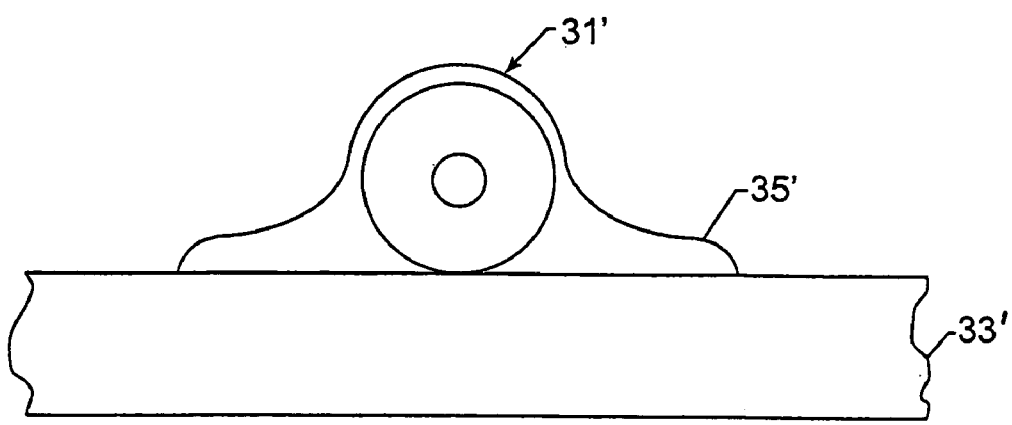

The metal layer 35 of FIG. 1, for example, may have a relatively uniform thickness by applying the plating solution in a tank. Other techniques of applying the plating solution, however, may result in different cross-sectional profiles of the metal layer. FIGS. 2A–B illustrate the application of plating solution to the substrate 33' and the optical fiber 31' using an open cell foam plating pad 45 and a resulting metal layer 35' having a fillet shaped profile. By pressing the open cell plating pad 45 against the optical fiber and the substrate surface as shown in FIG. 2A, the cells 36' on top of the optical fiber may be compressed thereby reducing mass transport of the plating solution to the top of the optical fiber. The plated metal layer 35' of FIG. 2B can thus have a fillet shape which may be desirable for some applications. The open cell foam plating pad 45 of FIG. 2A can thus be used to locally apply the plating solution.

Figure 3A:
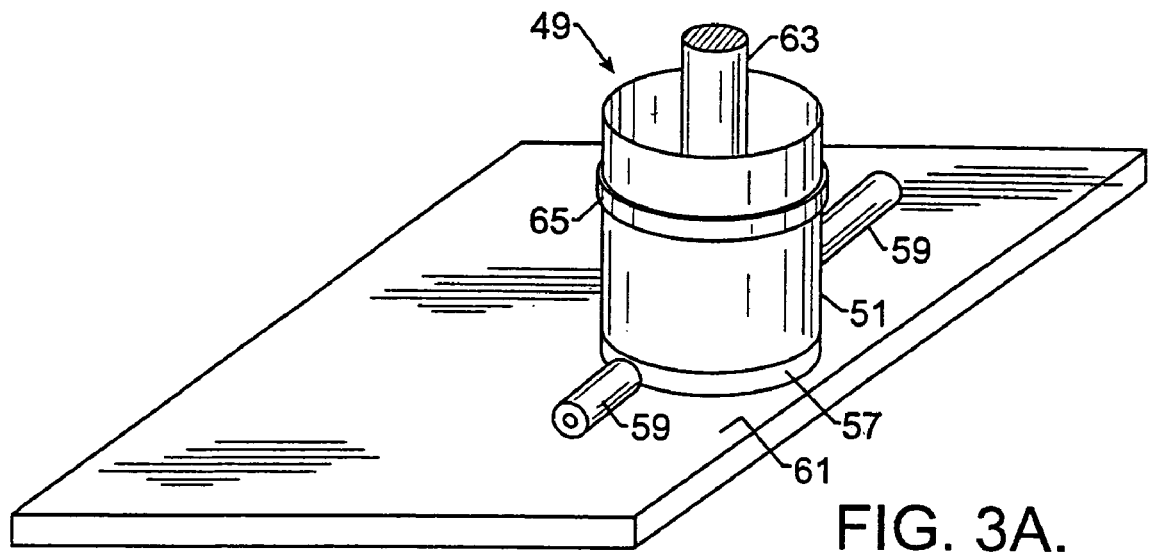
FIGS. 3A–D are perspective and cross-sectional views of an apparatus for bonding a component and a substrate according to embodiments of the present invention.
Figure 3B:
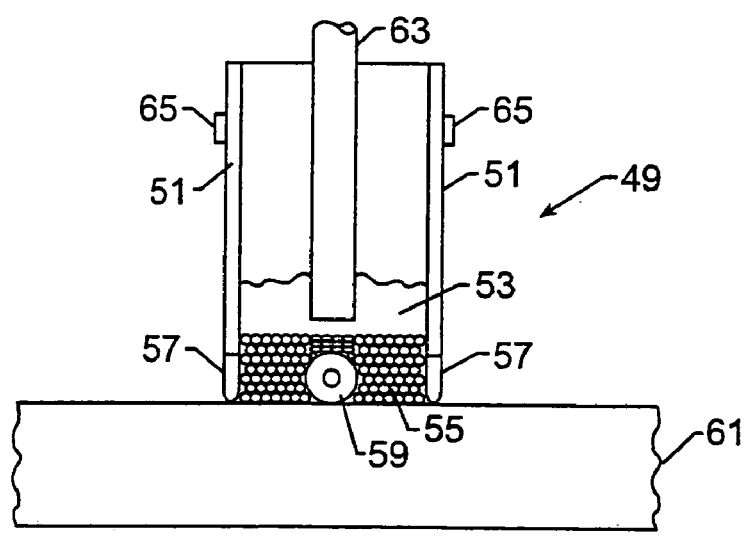

Embodiments of an apparatus 49 for locally applying plating solution to an optical fiber and substrate are illustrated in perspective and cross-sectional views of FIGS. 3A–B. As shown, a plating solution 53 can be confined within a dielectric tube 51 (such as a quartz tube) having an open cell foam pad 55 at one end thereof. The apparatus can also include a flexible O-ring 57 to facilitate a better fit with optical fiber 59 and substrate 61. In addition, the apparatus can include an anode 63 for electroplating and/or electrophoretic plating. An anode may not be required, however, for plating operations that do not require an application of an electrical potential such as electroless plating. As shown, the apparatus can also include a mounting ring 65 used to manipulate and position the tube 51.

More particularly, the open cell foam pad 55 and dielectric tube 51 can confine the plating solution 53 so that the plating solution does not spread across the substrate 61. The open cell foam pad, however, can allow passage of the plating solution to the optical fiber 59 and portions of the substrate with which it is in contact. The apparatus of FIGS. 3A–B can thus be used with electroplating solutions, electrophoretic plating solutions, and/or electroless plating solutions. With electroplating and/or electrophoretic plating solutions, an electrical potential can be applied between the anode and metallized surfaces of the substrate and optical fiber. With electroless plating solutions, the anode may not be required.

The optical fiber 59 can thus be positioned relative to the substrate 61 to obtain a desired orientation therebetween, and the optical fiber can be held in the desired orientation while the apparatus 49 is brought into contact with the optical fiber 59 and substrate 61. More particularly, an actuator can be coupled to the mounting ring 65, and the actuator can be used to position the apparatus on the optical fiber 59. The flexible O-ring 57 can provide a seal with respect to the optical fiber and the substrate to reduce undesired spreading of plating solution across the substrate 61 surface. While the O-ring is illustrated in FIGS. 3A–B, the O-ring is not required. The tube 51, for example, may include notches therein to allow passage of the fiber therethrough, and/or open cell foam may extend below the opening of the tube.

Figure 3C:
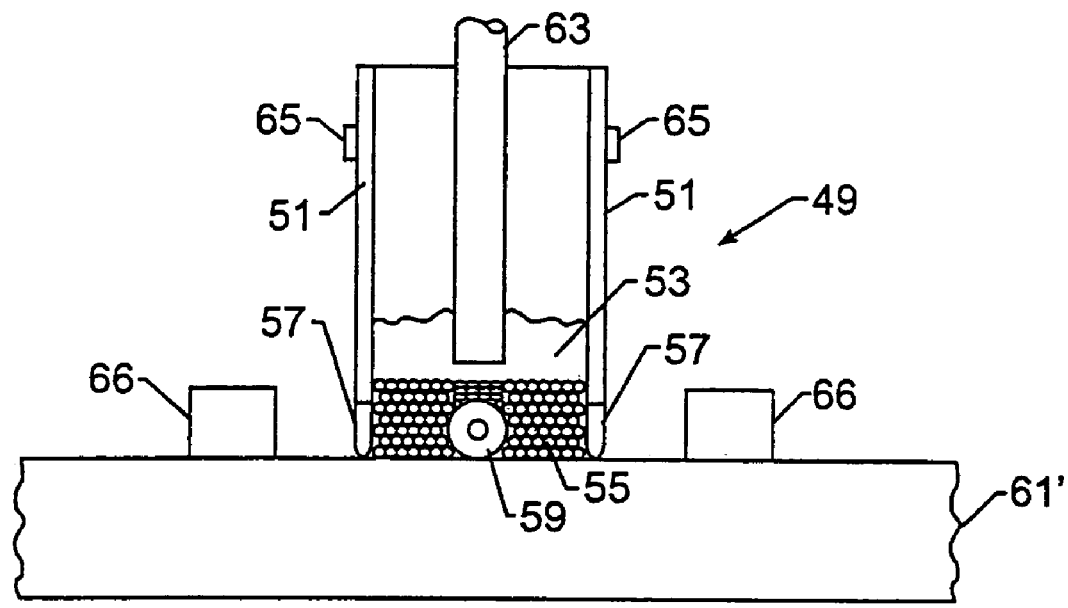
Figure 3D:
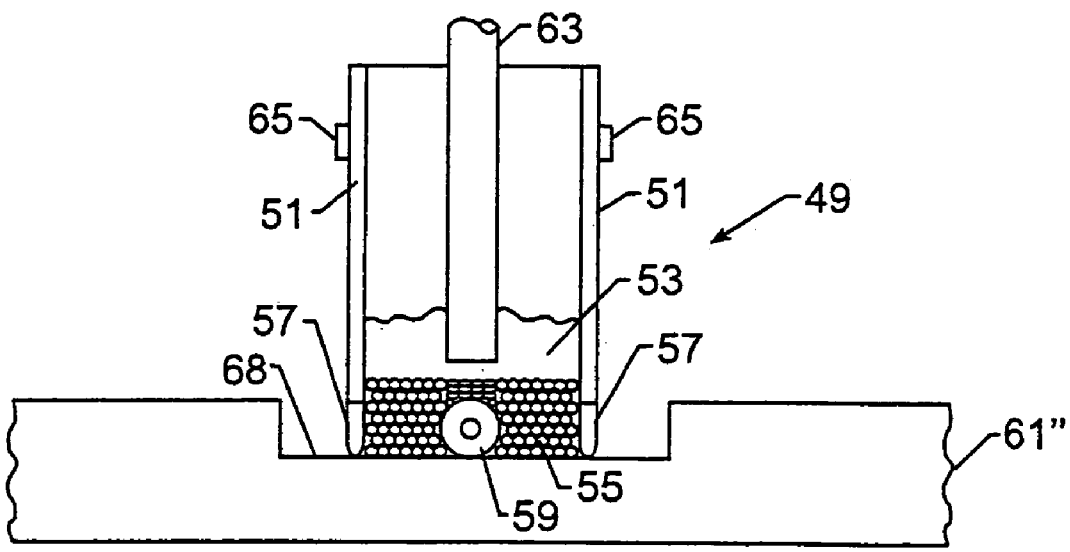

Alternatively, or in addition, a well may be provided in the substrate and/or a dam may be provided on the substrate to reduce undesired spreading of the plating solution. As shown in FIG. 3C, dam(s) 66 on substrate 61' may be used to reduce undesired spreading of the plating solution 53 across the surface of the substrate 61'. As shown in FIG. 3D, a well 68 (also referred to as a trench) in the substrate 61" may be used to reduce undesired spreading of the plating solution 53 across the surface of the substrate 61". The apparatus 49 illustrated in FIGS. 3C and 3D can be the same as that illustrated in FIG. 3B.

Moreover, the dam(s) 66 of FIG. 3C can be provided by forming a patterned layer on the substrate, and the well 68 of FIG. 3D can be provided by etching the substrate.

Once the apparatus 49 is brought into contact with the optical fiber and substrate, plating can begin. More particularly, plating solution 53 can feed through the open cell foam pad 55 to the optical fiber and the substrate 61. While an open cell foam pad is discussed by way of example, other porous materials could be used in place of open cell foam. With electroplating and/or electrophoretic plating, an electrical potential can be applied between the anode 63 and metallized surfaces of the substrate 61 and the optical fiber 59 to effect plating. With electroless plating, the anode may not be required.

Once a desired thickness of metal has been plated, the apparatus 49 can be removed from the optical fiber and substrate, and the plated metal layer can bond the optical fiber to the substrate in the desired orientation. More particularly, a plated metal layer such as that illustrated in FIG. 2B can bond the fiber and substrate. Because the optical fiber is now bonded with the plated metal layer, the fiber and/or substrate can be released from any equipment used for positioning during plating operations. The plated metal can be any metal suitable for plating such as, for example, nickel, lead, tin, silver, gold, and/or alloys thereof. The optical fiber can thus be bonded to a substrate using a metal layer while maintaining temperatures of the optical fiber and substrate below a melting temperature of the metal.

Figure 4:
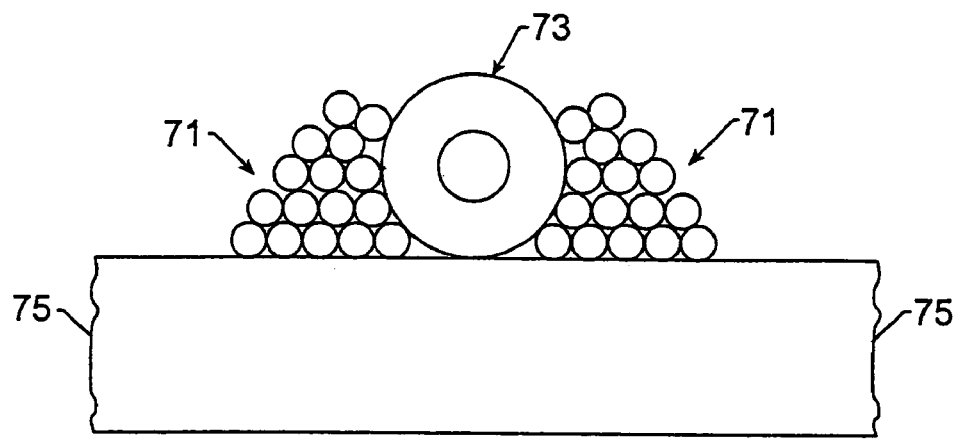
FIGS. 4–6 are cross-sectional views illustrating a component bonded to a substrate using metal particles according to embodiments of the present invention.

According to additional embodiments of the present invention, components can be bonded by providing particles of a metal adjacent the components and bonding the metal particles. As shown in FIG. 4, a plurality of metal particles 71 can be provided adjacent the optical fiber 73 and the substrate 75, and the metal particles 71 can be bonded while temperatures of the optical fiber 73 and the substrate 75 are maintained below a melting temperature of the metal of the metal particles. The metal particles 71 may be in the form of a metal powder, for example, or the metal particles may include a dielectric material (such as a glass sphere) coated with metal. In addition, bonding surfaces of the substrate and optical fiber may be metallized and/or provided with a catalyst to facilitate bonding with the metal particles.

The metal particles can be provided adjacent to the optical fiber and substrate prior to positioning the optical fiber, and then bonded after positioning the optical fiber. Alternatively, the optical fiber can be positioned relative to the substrate, and then the metal particles can be provided adjacent the optical fiber and substrate and bonded. While the optical fiber and metal particles are shown on a relatively flat substrate in FIG. 4, a well can be provided in the substrate, or a dam can be provided on the substrate to reduce spreading of the metal particles. In addition, the metal particles can be provided on the optical fiber opposite the substrate and/or between the fiber and the substrate.

Figure 5:
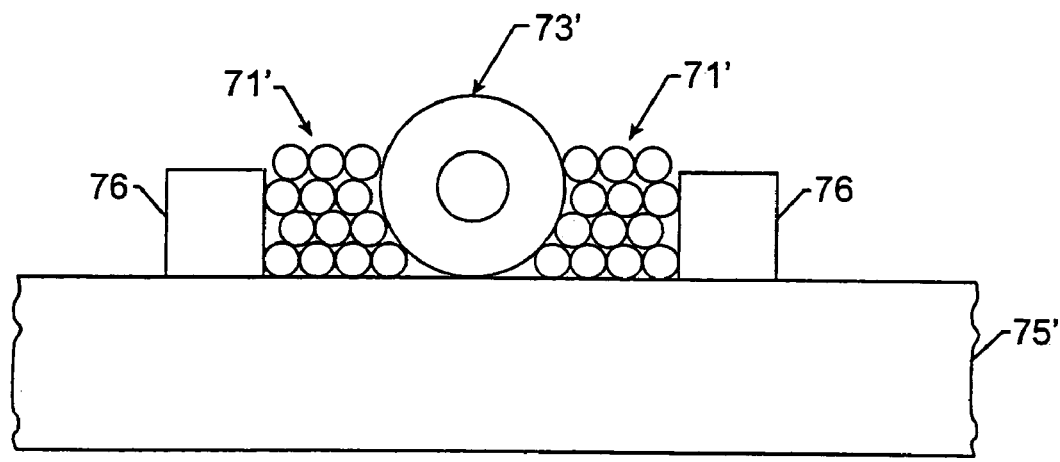
Figure 6:
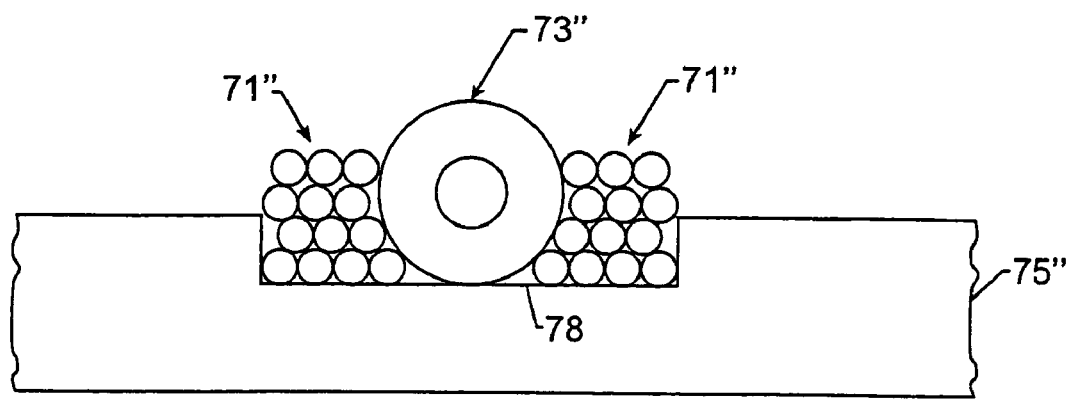

As shown in FIG. 5, the substrate 75' can have dam(s) 76 thereon to reduce spreading of the metal particles 71' across the surface of the substrate surface prior to bonding the metal particles 71' and the optical fiber 73' to the substrate 75'. As shown in FIG. 6, the substrate 75" can have a well 78 therein to reduce spreading of the metal particles 71" across the surface of the substrate surface prior to bonding the metal particles 71" and the optical fiber 73" to the substrate 75". The bonding of particles 71' and 71" of FIGS. 5 and 6 is the same as that described with respect to the bonding of particles 71 of FIG. 4. Moreover, the dam(s) 76 of FIG. 5 can be provided by forming a patterned layer on the substrate, and the well 78 of FIG. 6 can be provided by etching the substrate.

The metal particles 71 can be bonded using plating techniques similar to those discussed above with respect to FIGS. 1, 2A–B, and 3A–B. In particular, an electroplating, electrophoretic plating, and/or an electroless plating solution can be applied to the metal particles 71 and an electrical potential applied thereto (if needed) to bond the metal particles to each other and to surfaces of the optical fiber 73 and to the substrate 75. An apparatus similar to that of FIGS. 3A–B can be used to provide the plating solution and electrical potential (if needed).

According to alternative embodiments of the present invention, the metal particles 71 may be bonded by allowing diffusion between the metal particles. More particularly, the metal particles may comprise a metal having a relatively high diffusion rate at relatively low or ambient temperatures, such as indium. Accordingly, mere placement of the metal particles adjacent the substrate and optical fiber can result in bonding therebetween as the interfaces between metal particles 71 bond as a result of diffusion while maintaining the metal particles, optical fiber, and substrate below a melting temperature of the metal particles.

When using diffusion to bond the metal particles, it may be desirable to provide a diffusion barrier on the metal particles to reduce bonding during storage and to reduce bonding until the optical fiber has been positioned. A dielectric coating (such as an oxide), for example, may be provided on the metal particles to reduce diffusion until diffusion and bonding are desired. Accordingly, the metal particles can be stored and applied to the substrate without bonding, and then bonding can be effected by rupturing the dielectric coating. The dielectric coatings of the metal particles can be ruptured, for example, by applying an electrical potential thereto. Exposed portions of the metal in the metal particles can then bond as a result of diffusion.

A diffusion barrier may also be provided on the metal particles by providing a first metal with a first diffusion rate and by providing a coating of a second metal with a second diffusion rate on the first metal wherein the second diffusion rate is lower than the first diffusion rate. Accordingly, bonding of particles can be reduced until the coating of the second metal is diffused into the first metal. For example, the first metal may comprise indium, and the second metal may comprise copper. Accordingly, copper coated indium particles can be stored at a low temperature to maintain the copper diffusion barrier, and when applied at room temperature, the copper coating will diffuse into the indium particle so that indium from different particles can diffuse across interfaces therebetween to provide bonding. Alternatively, titanium, chromium, nickel, iridium, copper, and/or alloys thereof can be used to provide diffusion barriers on indium particles. A metal diffusion barrier can be provided on indium particles, for example, by vacuum deposition, chemical vapor deposition, or displacement reaction.

In addition, a diffusion barrier may be provided by a coating of a solid material that sublimes at room temperature. For example, indium particles can be coated with naphthalene or carbon dioxide and stored at a temperature sufficient to maintain the diffusion barrier in the solid state. Once the indium particles have been dispensed at room temperature, the diffusion barrier will sublime thereby allowing diffusion and bonding between indium particles.

Diffusion between metal particles can also be inhibited by vibrating the metal particles until bonding is desired. The metal particles, for example, can be maintained in a vibrating dispenser, and vibration (such as ultrasonic vibration) can be used to inhibit bonding of the metal particles. Once the metal particles are dispensed on a stationary substrate and optical fiber, diffusion and bonding can occur. Alternatively, the metal particles can be dispensed on the optical fiber and substrate which are vibrated until a desired orientation is achieved, and the vibration is ceased to allow diffusion and bonding.

Alternatively, diffusion between metal particles can be inhibited by providing the metal particles in a foam such as a cellulose foam. As long as the foam is maintained, many of the particles will be separated. Accordingly, the metal particles can be stored and dispensed as a foam, and the foam can be applied to the optical fiber and substrate without initiating bonding. Once the desired position of the optical fiber is achieved, diffusion and bonding can be initiated by collapsing the foam so that the metal particles come into contact and diffusion and bonding occur. The foam can be collapsed, for example, by adding a detergent and/or by introducing an atmosphere (such as nitrogen) that increases a surface tension of the foam.

By using metal particles having a high diffusion rate, bonding can be achieved at room temperature without generating excessive residues that might degrade a light path. Accordingly, post bonding cleaning may be reduced. In addition, bonding can be achieved relatively quickly. The use of diffusion to bond metal particles can also be referred to as cold welding. Moreover, the speed of diffusion and thus bonding can be increased by providing a flow of electrons through the metal particles, and/or by increasing a temperature of the metal particles to a temperature less than a melting temperature of the metal particles. By providing a flow of electrons through the metal particles, movements of metal atoms can be accelerated as a result of pressure due to electron flux, also referred to as electromigration. Cold welding can also be accelerated by applying pressure to the metal particles.

The metal particles can also be bonded by applying sufficient current through the metal particles so that metal particles are welded at interfaces therebetween. Here the increased welding temperature may be localized to interfaces between metal particles where current densities are the highest without significantly heating the bulk of the metal particles so that temperatures of the optical fiber and/or the substrate are maintained below the melting temperature of the metal. Bonding interfaces of metal particles using an electrical current to effect a weld may be done quickly without significantly increasing temperatures of the substrate and optical fiber. Moreover, the metal particles to be welded can comprise metal(s) having a relatively low creep rate and having relatively high stiffness so that a relatively rigid bond can be provided. Moreover, a metal bond may be effected without generating significant residues and/or particles. The bonding current, for example, could be generated using an arc discharge from a capacitor.

The metal particles used for bonding can alternatively comprise a metal that amalgamates with a liquid species at a temperature less than the melting temperature of the metal. The metal particles, for example, can be silver and/or gallium particles that amalgamate with mercury to generate an alloy thereof and to bond the particles. Accordingly, metal particles can be provided on the optical fiber and substrate either before or after positioning, and once the desired position is achieved, the liquid species can be introduced to the metal particles to effect alloying and bonding. The liquid species can be applied, for example, through a brush, a sponge, a pad, an open cell foam, or using any other application techniques known to those having skill in the art. Moreover, an apparatus similar to that illustrated in FIGS. 3A–B could be used to apply the liquid species.

According to additional embodiments of the present invention, corrosion may be used to bond metal particles. By facilitating corrosion of a mass of metal particles, interfaces of adjacent metal particles may bond as the respective layers of corrosion on different particles grow and merge. The corrosion, for example, can be the result of oxidation or galvanic corrosion.

As an example of bonding using oxidation, the metal particles may comprise iron. Once a desired position of the optical fiber has been achieved, iron particles adjacent the optical fiber and substrate can be exposed to moisture to facilitate oxidation of the iron particles. The oxide (rust) of adjacent iron particles can grow such that the respective rust layers merge to bond the adjacent particles. Bonding using oxidation can thus be effected without generating significant residues and without significantly increasing temperatures of the substrate or optical fiber.

Alternatively, galvanic corrosion can be used to effect bonding of adjacent particles. For example, the metal particles can include a mixture of particles of dissimilar metals such as aluminum and steel or aluminum and zinc. Galvanic corrosion and bonding of the particles can be initiated by introducing moisture to the particles so that substitution of the dissimilar metals (otherwise referred to as galvanic corrosion) results in bonding of the metal particles. Prior to bonding, bonding can be inhibited by maintaining the particles of dissimilar metals separate and/or dry.

Alternatively, bonding can be provided by a displacement reaction implemented using particles of a first metal and then applying a solution of a second more noble metal. For example, a solution of zinc can be applied to aluminum particles to cause galvanic corrosion of the aluminum particles. Since aluminum is trivalent and zinc is divalent, there is an increase in particle volume, further increasing an intimacy of contact between the particles, component, and substrate. In other words, zinc atoms will be substituted for aluminum atoms at the surface of the aluminum particles, and because three zinc atoms will be substituted for every two aluminum atoms replaced, the aluminum particles will grow as a result of the galvanic corrosion (also referred to as a substitution reaction). Accordingly, the aluminum particles can bond at interfaces therebetween as zinc is substituted for aluminum. Moreover, the solution of the dissimilar metal can be applied through a brush, a sponge, a pad, an open cell foam, or using any other application techniques known to those having skill in the art. Displacement reactions can thus be used to bond metal particles without significantly increasing temperatures of the optical fiber or substrate and without generating significant residues. Surfaces of the component and/or substrate may also be metallized with aluminum to further facilitate bonding.

The various techniques discussed above can thus be used to provide metal bonding between two components while maintaining the two components below a melting temperature of the bonding metal. While bonding of an optical fiber to a substrate is discussed by way of example, methods, structures, and apparatus according to embodiments of the present invention can be applied to the bonding of substrates, optical components, micro-electronic components, and/or micro-mechanical components. Moreover, the particular metals and/or solutions discussed for providing bonding are discussed by way of example only without limiting the present invention to the particular examples discussed.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of bonding two components, the method comprising:
    positioning the two components relative to one another to obtain a desired orientation; and
    bonding the two components in the desired orientation with metal wherein a temperature of both components is maintained below a melting temperature of the metal while bonding wherein bonding comprises providing an electrophoretic coating on the two components wherein the electrophoretic coating comprises the metal and dielectric particles.

2. A method according to claim 1 wherein at least one of the two components comprises a micro-electronic component, an optical component, and/or a micro-mechanical component.

3. A method according to claim 1 wherein at least one of the two components comprises an optical component.

4. A method of bonding two components, the method comprising:
   positioning the two components relative to one another to obtain a desired orientation; and
   bonding the two components in the desired orientation with metal wherein a temperature of both components is maintained below a melting temperature of the metal while bonding;
   wherein bonding comprises providing particles of the metal on the two components and bonding the metal particles;
   wherein each of the particles of the metal comprises a dielectric material coated with the metal before bonding the two components.

5. A method according to claim 4 wherein at least one of the two components comprises a micro-electronic component, an optical component, and/or a micro-mechanical component.

6. A method according to claim 4 wherein at least one of the two components comprises an optical component.

7. A method of bonding two components, the method comprising:
   positioning the two components relative to one another to obtain a desired orientation; and
   bonding the two components in the desired orientation with metal wherein a temperature of both components is maintained below a melting temperature of the metal while bonding;
   wherein bonding comprises providing particles of the metal with a dielectric coating thereon on the two components and bonding the metal particles;
   wherein bonding the metal particles includes rupturing the dielectric coatings by passing an electric current through the particles.

8. A method according to claim 7 wherein at least one of the two components comprises a micro-electronic component, an optical component, and/or a micro-mechanical component.

9. A method according to claim 7 wherein at least one of the two components comprises an optical component.

10. A method of bonding two components, the method comprising:
    positioning the two components relative to one another to obtain a desired orientation; and
    bonding the two components in the desired orientation with metal wherein a temperature of both components is maintained below a melting temperature of the metal while bonding;
    wherein bonding comprises providing particles of the metal with a coating of a solid material that sublimes at a bonding temperature less than the melting temperature of the metal on the two components and bonding the metal particles.

11. A method according to claim 10 wherein bonding the metal particles comprises allowing diffusion between the metal particles.

12. A method according to claim 11 wherein the metal comprises a metal having a relatively high diffusion rate at room temperature.

13. A method according to claim 12 wherein the metal comprises Indium.

14. A method according to claim 11 wherein providing the particles of the metal comprises providing the particles of the metal with a dielectric coating thereon and wherein bonding the metal particles is preceded by rupturing the dielectric coatings.

15. A method according to claim 11 wherein providing the particles of the metal comprises providing the particles of the metal with a diffusion barrier thereon and wherein bonding the metal particles is preceded by rupturing the diffusion barrier.

16. A method according to claim 10 wherein the solid material comprises one of naphthalene or carbon dioxide.

17. A method according to claim 10 wherein at least one of the two components comprises a micro-electronic component, an optical component, and/or a micro-mechanical component.

18. A method according to claim 10 wherein at least one of the two components comprises an optical component.

19. A method of bonding two components, the method comprising:
    positioning the two components relative to one another to obtain a desired orientation; and
    bonding the two components in the desired orientation with metal wherein a temperature of both components is maintained below a melting temperature of the metal while bonding;
    wherein bonding comprises providing particles of the metal on the two components and bonding the metal particles; and
    wherein providing the particles of the metal comprises vibrating the metal particles apart from the two components, and after positioning the components, applying the metal particles to the two components.

20. A method according to claim 19 wherein at least one of the two components comprises a micro-electronic component, an optical component, and/or a micro-mechanical component.

21. A method according to claim 19 wherein at least one of the two components comprises an optical component.

22. A method of bonding two components, the method comprising:
    positioning the two components relative to one another to obtain a desired orientation; and
    bonding the two components in the desired orientation with metal wherein a temperature of both components is maintained below a melting temperature of the metal while bonding;
    wherein bonding comprises providing particles of the metal on the two components and bonding the metal particles; and
    wherein bonding the metal particles comprises passing an electrical current through the metal particles sufficient to weld interfaces thereof.

23. A method according to claim 22 wherein at least one of the two components comprises a micro-electronic component, an optical component, and/or a micro-mechanical component.

24. A method according to claim 22 wherein at least one of the two components comprises an optical component.

25. A method of bonding two components, the method comprising:
    positioning the two components relative to one another to obtain a desired orientation; and
    bonding the two components in the desired orientation with metal wherein a temperature of both components is maintained below a melting temperature of the metal while bonding;

wherein bonding comprises providing particles of the metal on the two components and bonding the metal particles; and wherein providing the metal particles comprises providing the metal particles in a foam and wherein bonding the metal particles comprises collapsing the foam.

26. A method according to claim 25 wherein at least one of the two components comprises a micro-electronic component, an optical component, and/or a micro-mechanical component.

27. A method according to claim 25 wherein at least one of the two components comprises an optical component.

28. A method of bonding two components, the method comprising:

positioning the two components relative to one another to obtain a desired orientation; and bonding the two components in the desired orientation with metal wherein a temperature of both components is maintained below a melting temperature of the metal while bonding;

wherein bonding comprises providing particles of the metal on the two components and bonding the metal particles; and wherein bonding the metal particles comprises introducing a liquid species that amalgamates with the particles at a bonding temperature less than the melting temperature of the metal.

29. A method according to claim 28 wherein the metal comprises silver and the liquid species comprises mercury.

30. A method according to claim 28 wherein at least one of the two components comprises a micro-electronic component, an optical component, and/or a micro-mechanical component.

31. A method according to claim 28 wherein at least one of the two components comprises an optical component.

32. A method of bonding two components, the method comprising:

positioning the two components relative to one another to obtain a desired orientation; and bonding the two components in the desired orientation with metal wherein a temperature of both components is maintained below a melting temperature of the metal while bonding;

wherein bonding comprises providing particles of the metal on the two components and bonding the metal particles; and wherein bonding the metal particles comprises corroding the metal particles.

33. A method according to claim 32 wherein corroding the metal particles comprises oxidizing the metal particles.

34. A method according to claim 33 wherein corroding the metal particles comprises galvanically corroding the metal particles.

35. A method according to claim 32 wherein at least one of the two components comprises a micro-electronic component, an optical component, and/or a micro-mechanical component.

36. A method according to claim 32 wherein at least one of the two components comprises an optical component.

37. A method of bonding two components, the method comprising:

positioning the two components relative to one another to obtain a desired orientation; and bonding the two components in the desired orientation with metal wherein a temperature of both components is maintained below a melting temperature of the metal while bonding;

wherein bonding comprises providing particles of the metal on the two components and bonding the metal particles; and wherein bonding the metal particles comprises plating a metal on the metal particles after providing the metal particles on the two components.

38. A method according to claim 37 wherein at least one of the two components comprises a micro-electronic component, an optical component, and/or a micro-mechanical component.

39. A method according to claim 37 wherein at least one of the two components comprises an optical component.

40. A method of bonding two components, the method comprising:

positioning the two components relative to one another to obtain a desired orientation; and bonding the two components in the desired orientation with metal wherein a temperature of both components is maintained below a melting temperature of the metal while bonding;

wherein bonding comprises providing particles of the metal on the two components and bonding the metal particles; and wherein bonding the metal particles comprises providing a solution of a second metal on the metal particles to initiate a displacement reaction.

41. A method according to claim 40 wherein at least one of the two components comprises a micro-electronic component, an optical component, and/or a micro-mechanical component.

42. A method according to claim 40 wherein at least one of the two components comprises an optical component.

43. A method of bonding two components, the method comprising:

providing particles of a metal on at least one of the two components and vibrating the particles; then positioning the two components relative to one another to obtain a desired orientation wherein positioning the two components comprises positioning the two components while vibrating the particles; and bonding the two components in the desired orientation with metal wherein a temperature of both components is maintained below a melting temperature of the metal while bonding wherein bonding the two components comprises ceasing vibrating the particles.

44. A method according to claim 43 wherein at least one of the two components comprises a micro-electronic component, an optical component, and/or a micro-mechanical component.

45. A method according to claim 43 wherein at least one of the two components comprises an optical component.

* * * * *